US012683889B2

(12) United States Patent  
Lin et al.

(10) Patent No.:  US 12,683,889 B2  
(45) Date of Patent:       Jul. 14, 2026

(54) METHOD FOR AUTOMATICALLY CHANGING A TOPOLOGY OF A PLURALITY OF NETWORK SWITCHES

(71) Applicant: Alpha Networks Inc., Hsinchu (TW)

(72) Inventors: Cheng-Hsien Lin, Hsinchu (TW); Hsiu-Ching Lin, Hsinchu (TW); Jian Wang, Hsinchu (TW); Daobing Tang, Hsinchu (TW); Qian Xu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 118 days.

(21) Appl. No.: 18/939,742

(22) Filed: Nov. 7, 2024

(65) Prior Publication Data

US 2025/0373534 A1      Dec. 4, 2025

(30) Foreign Application Priority Data

Jun. 3, 2024    (TW) ................................. 113120456

(51) Int. Cl.  
H04L 43/50        (2022.01)  
H04L 49/25        (2022.01)

(52) U.S. Cl.  
CPC ............ H04L 43/50 (2013.01); H04L 49/258 (2013.01)

(58) Field of Classification Search  
CPC ................................ H04L 43/50; H04L 41/12  
See application file for complete search history.

(56) References Cited

U.S. PATENT DOCUMENTS

| | | | | |
|---|---|---|---|---|
| 2003/0193891 A1* | 10/2003 | Chen | ..................... | G06F 11/00 370/217 |
| 2006/0092853 A1* | 5/2006 | Santoso | ................. | H04L 49/35 370/254 |
| 2016/0020939 A1* | 1/2016 | Ramasubramanian | ..................... | H04L 41/40 370/217 |
| 2019/0044848 A1* | 2/2019 | Shivaram | ................ | H04L 45/02 |
| 2023/0098049 A1* | 3/2023 | Calciu | ................... | H04L 45/245 370/400 |
| 2024/0073131 A1* | 2/2024 | Stan | ........................ | H04L 43/50 |
| 2025/0358176 A1* | 11/2025 | Zhu | ..................... | H04L 43/0805 |

FOREIGN PATENT DOCUMENTS

WO      WO-2010009639 A1 *  1/2010 ............. H04L 49/65

* cited by examiner

*Primary Examiner* — Hieu T Hoang  
(74) *Attorney, Agent, or Firm* — HSML P.C.

(57)                ABSTRACT

A method for automatically changing a topology includes: activating a number (i) of network switches included in a stack, a last switch and first (i–1) network switches being included in the stack; deactivating one of the activated switches as a deactivated switch; decoupling the last switch from the other activated switches, and resetting the last switch; disabling settings of Link Aggregation Control Protocol (LACP) between the last switch and a switch device, disabling settings of LACP between the last switch and a neighboring device, and performing a reset configuration operation to reconfigure a connection setting between the last switch and the switch device and a connection setting between the last switch and the neighboring device; and establishing settings of LACP between the last switch and each of the network switches that is neither the deactivated switch nor the last switch.

8 Claims, 7 Drawing Sheets

METHOD FOR AUTOMATICALLY CHANGING A TOPOLOGY OF A PLURALITY OF NETWORK SWITCHES

CROSS-REFERENCE TO RELATED APPLICATION

This application claims priority to Taiwanese Invention Patent Application No. 113120456, filed on Jun. 3, 2024, the entire disclosure of which is incorporated by reference herein.

FIELD

The disclosure relates to a method for topology adjustment, and more particularly to a method for automatically changing a topology of a plurality of network switches.

BACKGROUND

In the field of networking hardware, network switches are components that are configured to connect electronic devices to a computer network. Typically, current network switches are configured to support multi-layer functionalities (e.g., layer-2, layer-3 switching technologies) within the Ethernet. Also, the network switches may be "stackable", that is, multiple network switches may be set up together via a stacking protocol to operate in a cooperative manner showing characteristics of a single switch but having the port capacity of the sum of the multiple network switches. As such, multiple switches may be stacked to form one unit in a network topology arrangement. Generally, the stackable multi-layer switches may be arranged in one of a number of topologies, such as the point-to-point topology, the loop topology, the mesh topology, etc. Each of the topologies may have specific pros and cons, and therefore it may be beneficial to employ different topologies in different occasions.

Conventionally, for a number of stackable network switches, in order to switch from one topology to another, a personnel manually reconfigures the physical connections among the network switches and changes a number of settings associated with the connections. In such cases, when a total number of the network switches is relatively large, the operation of switching from one topology to another may become time consuming and may be prone to human mistakes. In the cases where the topology of the stackable network switches needs to be frequently changed (e.g., when it is desired to test routing efficiency associated with the stackable network switches in different topologies), the potential issues associated with manually reconfiguring the physical connections among the stackable network switches and changing the number of settings associated with the connections may deteriorate.

SUMMARY

Therefore, an object of the disclosure is to provide a method that is for automatically changing a topology of a number of network switches in a more efficient manner.

According to the one embodiment of the disclosure, the method for automatically changing a topology of a plurality of network switches, is used on a topology structure that includes a to-be-tested stack, a neighboring device and a switch device. The to-be-tested stack is connected to the neighboring device and the switch device through Link Aggregation Control Protocol (LACP). The to-be-tested stack including a number N of network switches that are stacked in a manner where any adjacent two of the network switches are connected to each other. N is not smaller than 3. Each of the network switches that is not a last switch among the number N of network switches being connected directly to the last switch. The method is implemented using a computing device connected to the topology structure and includes steps of:

a) activating a number (i) of network switches included in the to-be-tested stack as activated switches, the number (i) of network switches including the last switch and the first (i−1) network switches in the to-be-tested stack;

b) deactivating one of the activated switches excepting the last switch as a deactivated switch;

c) decoupling the last switch from the other activated switches, and resetting the last switch;

d) disabling settings of LACP between the last switch and the switch device, disabling settings of LACP between the last switch and the neighboring device, and performing a reset configuration operation to reconfigure a connection setting between the last switch and the switch device and a connection setting between the last switch and the neighboring device; and e) establishing settings of LACP between the last switch and each of the network switches that is neither the deactivated switch nor the last switch.

According to another embodiment of the disclosure, the method for automatically changing a topology of a plurality of network switches is used on a topology structure that includes a to-be-tested stack, a neighboring device and a switch device. The to-be-tested stack is connected to the neighboring device and the switch device through Link Aggregation Control Protocol (LACP). The to-be-tested stack includes a number M of network switches that are stacked in a manner where any adjacent two of the network switches are connected to each other. M is not smaller than 5. Each of the network switches that is not a last switch among the number M of network switches is connected directly to the last switch. A first switch is connected directly to a third-to-last switch among the number M of network switches. The method being implemented using a computing device connected to the topology structure and includes steps of:

a) activating a number (j) of network switches included in the to-be-tested stack as activated switches, the number (j) of network switches including a first switch and last (j−1) network switches in the to-be-tested stack;

b) deactivating two of the activated switches as deactivated switches;

c) decoupling the last switch and the third-to-last switch from the other activated switches, and resetting the last switch and the third-to-last switch;

d) disabling settings of LACP between the last switch and the switch device, disabling settings of LACP between the last switch and the neighboring device, and performing a reset configuration operation to reconfigure a connection setting between the last switch and the switch device and a connection setting between the last switch and the neighboring device;

e) disabling settings of LACP between the third-to-last switch and the switch device, disabling settings of LACP between the third-to-last switch and the neighboring device, and performing a reset configuration operation to reconfigure a connection setting between the third-to-last switch and the switch device and a connection setting between the third-to-last switch and the neighboring device;

f) establishing settings of LACP between the last switch and each of the activated switches that is not one of the last switch and the third-to-last switch;

g) configuring a connection setting between the third-to-last switch and the first switch; and h) configuring a connection setting between the third-to-last switch and the last switch.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
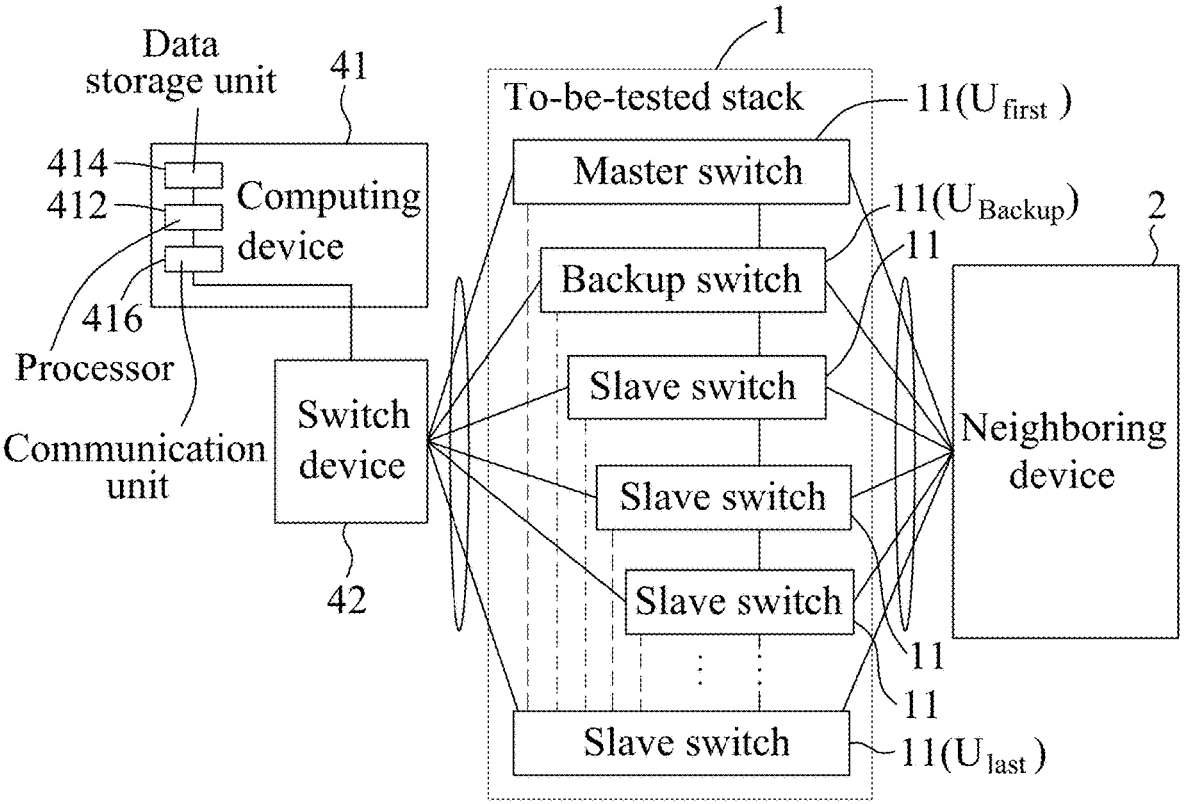
FIG. 1 is a block diagram of a system for automatically changing a topology of a plurality of network switches according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

FIG. 1 is a block diagram of a system for automatically changing a topology of a plurality of network switches according to one embodiment of the disclosure. The system includes a to-be-tested stack 1, a neighboring device 2, a switch device 42 and a computing device 41. It is noted that the combination of the to-be-tested stack 1, the neighboring device 2 and the switch device 42 may be referred to as a topology structure.

The to-be-tested stack 1 includes a number N of network switches 11. In some embodiments, N is not smaller than 3. Each of the network switches 11 may be embodied using a network switch that supports multi-layer functionalities (e.g., layer-2, layer-3 switching technologies) within the Ethernet. Also, the network switches 11 are configured to be "stackable", that is, multiple network switches 11 may be set up together via a stacking protocol to operate in a cooperative manner), as such, multiple network switches 11 may be stacked to form one unit in a network topology arrangement, showing characteristics of a single switch but having the port capacity of the sum of the multiple network switches 11). In the embodiment of FIG. 1, the network switches 11 are stacked in the following manner. The network switches 11 are arranged in a top-down column, with two adjacent network switches 11 being physically connected to each other using a physical cable or a wire (indicated by the solid lines). In some embodiments, the solid lines may be embodied using wires called stacking cables, and in actual implementations, the network switches 11 that are connected directly or indirectly through the stacking cables may be considered as one single network switch 11 with a higher capacity. One of the network switches 11 that is placed on the top (i.e., at the start of the column) is also referred to as a master switch ($U_{first}$) that is used for communicating with the external environment, and one of the network switches 11 that is placed on the bottom (i.e., at the end of the column) is referred to as a last switch ($U_{last}$). One of the network switches 11 that is neither the master switch nor the last switch may be assigned as a backup switch ($U_{backup}$) for the master switch, and each of the network switches 11 that is neither the master switch nor the backup switch may be referred to as a slave switch. It is noted that while four slave switches (including the last switch) are present in the embodiment of FIG. 1, additional slave switches may be employed in other embodiments. Moreover, in other embodiments, another one of the network switches 11 included in the to-be-tested stack 1 may be assigned as the master switch, and yet another one of the network switches 11 included in the to-be-tested stack 1 may be assigned as the backup switch. That is to say, the assignment of the master switch and the backup switch is not limited to the configuration of FIG. 1.

In addition to the above connection, each of the network switches 11 that is not the last switch is also directly connected to the last switch (indicated by the broken lines). In some embodiments, the connections indicated by the broken lines may be implemented using physical cables that support the Link Aggregation Control Protocol (LACP).

Generally, the stackable multi-layer switches may be arranged in one of a number of topologies, such as the point-to-point topology, the loop topology, the mesh topology, etc. The arrangement of the network switches 11 and the neighboring device 2 shown in FIG. 1 is called the point-to-point topology. It is noted that in order to achieve the loop topology, at least three network switches 11 are needed on the to-be-tested stack 1, while in order to achieve the mesh topology, at least five network switches 11 are needed on the to-be-tested stack 1.

The neighboring device 2 is connected to each of the network switches 11 included in the to-be-tested stack 1. In this embodiment, the neighboring device 2 may be embodied using another network switch that has the functionalities of the network switches 11 included in the to-be-tested stack 1. That is, the neighboring device 2 also supports multi-layer (i.e., layer-2 and layer-3) functionalities within the Ethernet, supports the routing protocols with the network switches 11, and is also stackable. In use, the neighboring device 2 is configured to communicate with the network switches 11 using a specific routing protocol, and exchange data packets. Generally, the neighboring device 2 is configured to communicate with the network switches 11 using the LACP.

The switch device 42 is connected to each of the network switches 11 included in the to-be-tested stack 1. In this embodiment, the switch device 42 may be embodied using another network switch that has the functionalities of the network switches 11 included in the to-be-tested stack 1. Generally, the switch device 42 is configured to communicate with the network switches 11 using the LACP.

The computing device 41 is connected to the switch device 42, and may be embodied using a server, a personal computer, a laptop, a tablet, a smartphone, or other suitable equipment. The computing device 41 includes a processor 412, a data storage unit 414 and a communication unit 416 (see FIG. 1).

The processor 412 may be embodied using a central processing unit (CPU), a microprocessor, a microcontroller, a single core processor, a multi-core processor, a dual-core mobile processor, a digital signal processor (DSP), a field-programmable gate array (FPGA), an application specific integrated circuit (ASIC), a radio-frequency integrated circuit (RFIC), etc.

The data storage unit 414 is connected to the processor 412, and may be embodied using, for example, random access memory (RAM), read only memory (ROM), programmable ROM (PROM), firmware, flash memory, etc. In use, the data storage unit 414 stores a software application that includes instructions. When the instructions are executed by the processor 412, they may cause the processor 412 to implement the operations as described below.

The communication unit 416 is connected to the processor 412, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like. The communication unit 416 enables the computing device 41 to communicate with the switch device 42, and in turn controls the operations of the to-be-tested stack 1.

It is noted that in many cases, it may be desired to switch the topology of the to-be-tested stack 1 from the point-to-point topology to the loop topology or the mesh topology. As such, a user may operate the computing device 41 to initiate a method for automatically changing a topology of a plurality of network switches.

Figure 2:
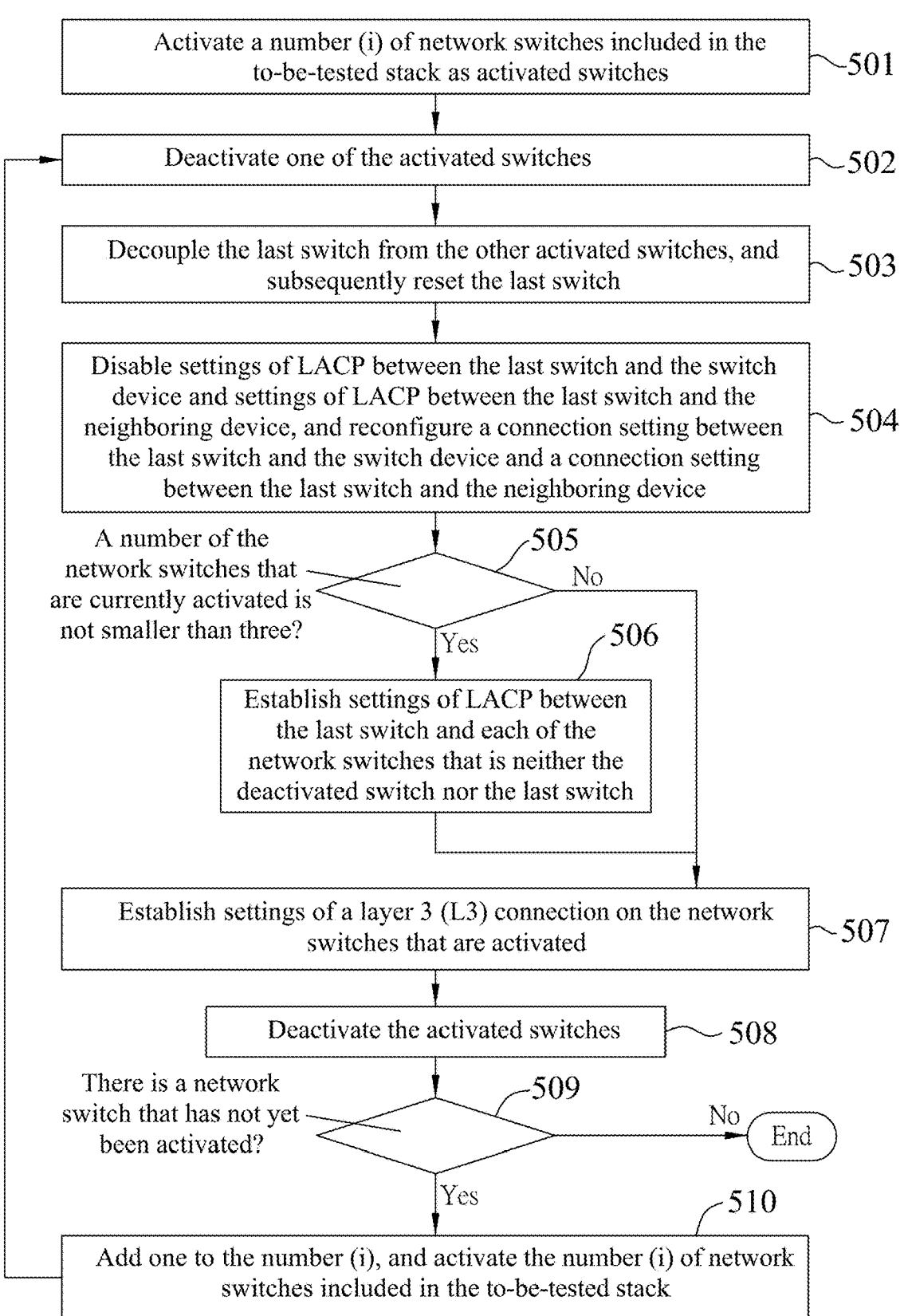
FIG. 2 is a flow chart illustrating steps of an exemplary method for automatically changing a topology of a plurality of network switches according to one embodiment of the disclosure.

FIG. 2 is a flow chart illustrating steps of an exemplary method for automatically changing a topology of a plurality of network switches according to one embodiment of the disclosure. In the embodiment of FIG. 2, the method is implemented using the system of FIG. 1. It is noted that the embodiment of FIG. 2 illustrates the topology of the to-be-tested stack 1 being switched from the point-to-point topology to the loop topology. Initially, the network switches 11 in the to-be-tested stack 1 are deactivated.

In step 501, the computing device 41 activates a number (i) of network switches 11 included in the to-be-tested stack 1, and (i) is an integer not smaller than 3. In the embodiment of FIG. 2, (i) equals 3, and the number (i) of network switches 11 include the last switch and a number (i−1) of network switches 11 that are arranged from the top of the column, meaning the first (i−1) network switches 11 in the to-be-tested stack 1 (i.e., (i−1) equals two, meaning that the first two network switches 11 (the master switch and the backup switch) of FIG. 1 are activated). The network switches 11 that are activated in step 501 are referred to as activated switches.

In step 502, the computing device 41 deactivates one of the activated switches, excepting the last switch. In the embodiment of FIG. 2, one of the network switches 11 that is arranged in the $(i-1)^{th}$ one of the stack is deactivated. That is to say, one of the activated switches that is the second-to-last switch may be deactivated, and is referred to as the deactivated switch.

In step 503, the computing device 41 decouples the last switch from the other activated switches (excluding the last switch and the deactivated switch) (that is, to break the last switch from the original connections within the to-be-tested stack 1 using the stacking cables), and subsequently resets the last switch. Specifically, in some cases, as the one of the activated switches (arranged in the $(i-1)^{th}$ one of the stack) is deactivated, a link down occurs for the stacking cable between the last switch and the deactivated switch. As such, the last switch is now no longer stacked with the other activated switches. This effectively makes the last switch and the other activated switches which are still stacked as two individual components.

In step 504, the computing device 41 disables settings of LACP between the last switch and the switch device 42 and settings of LACP between the last switch and the neighboring device 2, and performs a reset configuration operation to reconfigure a connection setting between the last switch and the switch device 42 and a connection setting between the last switch and the neighboring device 2. That is to say, the connection setting between the last switch and the switch device 42 (or the neighboring device 2) is changed from LACP to another type of protocols.

In step 505, the computing device 41 determines whether a number of the network switches 11 that are currently activated is not smaller than 3. That is, in this embodiment, the computing device 41 determines whether the number (i−1) is not smaller than 3. In a case where it is determined that the number of the network switches 11 that are currently activated is not smaller than 3, the flow proceeds to step 506. Otherwise, the flow proceeds to step 507.

In step 506, the computing device 41 establishes settings of LACP between the last switch and each of the network switches 11 that is neither the deactivated switch nor the last switch. In this manner, a single logic connection is formed using a number of physical connections that are configured with the settings of LACP, in order to be able to carry more network traffic.

Figure 3:
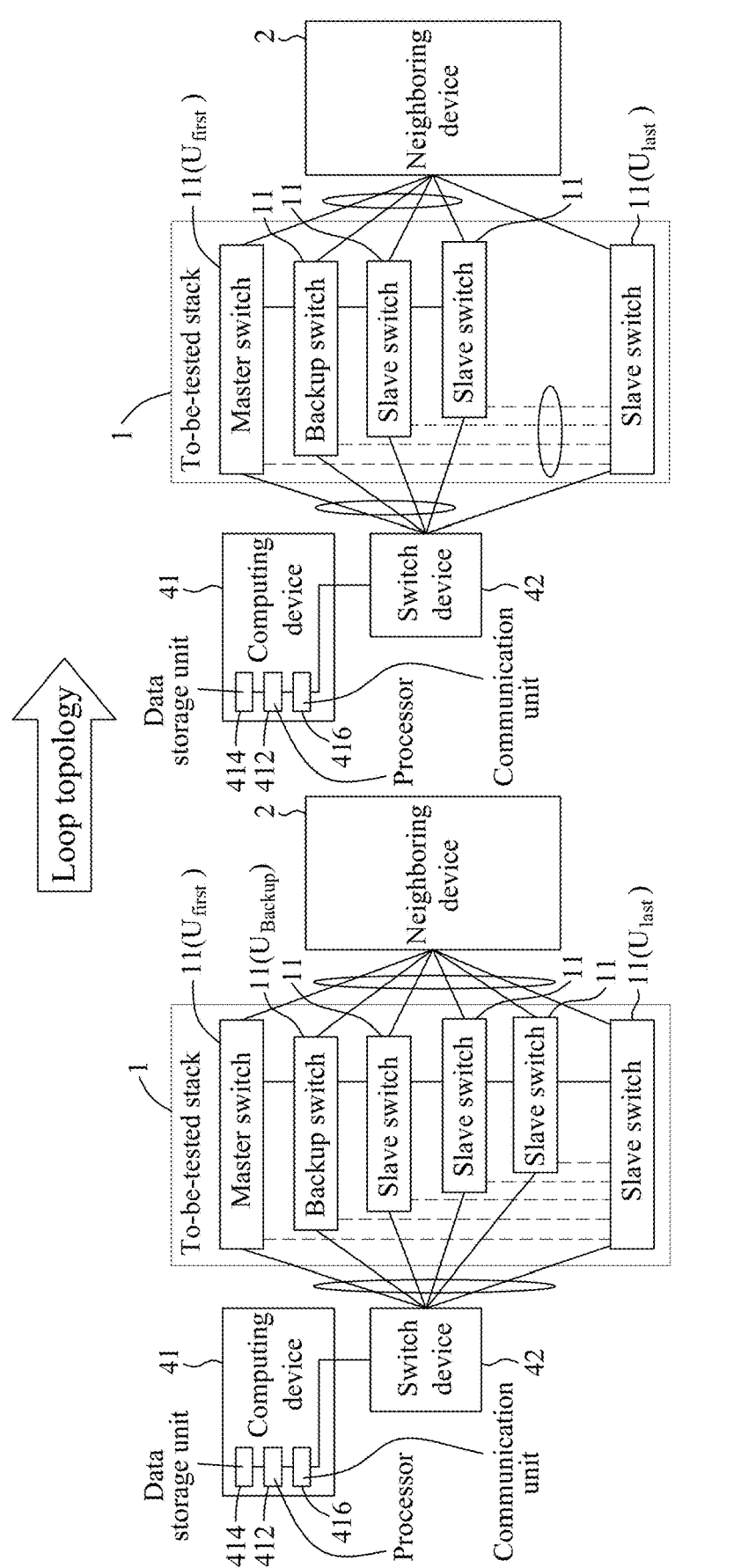
FIG. 3 illustrates the topologies of the network switches being changed from the point-to-point topology to the loop topology.

FIG. 3 illustrates the topologies of the network switches 11 being switched from the point-to-point topology to the loop topology. It is noted that each of the ellipses shown in FIG. 3 is drawn to cover a number of lines that interconnect the components of the system to indicate that those physical connections are configured with settings of LACP. That is to say, each of the ellipses indicates a single logic connection formed by the physical connections covered by the ellipse.

In step 507, the computing device 41 establishes settings of a layer 3 (L3) connection on the network switches 11 that are, at this stage, activated (that is, the deactivated switch is excluded). As such, the last switch is now connected to the switch device 42 and the neighboring device 2, and other stacked network switches 11 are now connected to the switch device 42 and the neighboring device 2 with the settings of LACP connections, and are connected to the last switch with the settings of LACP. Such configuration is referred to as the loop topology.

In some embodiments, after the operations of step 507 are completed, the to-be-tested stack 1 has been changed into the loop topology and is available to be subjected to a testing procedure to test routing efficiency associated with the L3 connection. It is noted that in this embodiment, the operations of step 507 are done with respect to settings of the L3 connection, while in other embodiments, the operations of step 507 are done with respect to settings of a layer 2 (L2) connection. In other embodiments, the computing device 41 may be configured such that a user is able to choose whether to test routing efficiency associated with the L2 connection prior to the steps of the method as shown in FIG. 2 being performed. It is noted that the testing procedure for testing the routing efficiency is well known in the related art, details thereof are omitted herein for the sake of brevity.

Then, in step 508, the computing device 41 deactivates the number (i) of network switches 11 that are activated in step 501. It is noted that in practice, the computing device 41 may transmit a deactivation signal to each of the (i) of network switches 11; alternatively, since the deactivated switch has already been deactivated, the computing device 41 may transmit the deactivation signal to each of the (i–1) of network switches 11 that are still activated and may not transmit the deactivation signal to the deactivated switch.

In step 509, the computing device 41 determines whether there is a network switch 11 that has not yet been activated. In a case where it is determined that there is a network switch 11 that has not yet been activated (meaning that the to-be-tested stack 1 includes at least one additional network switch 11 that can be added to the changed topology), the flow proceeds to step 510. Otherwise, in a case where it is determined that there is not a network switch 11 that has not yet been activated, the method is terminated.

In step 510, the computing device 41 adds one to the number (i), and activates the number (i) of network switches 11 included in the to-be-tested stack 1. In the embodiment of FIG. 2, (i) now equals 4, and the number (i) of network switches 11 include the last switch and the number (i–1) of network switches 11 that are arranged from the top of the column (i.e., the first (i–1) network switches 11 of the to-be-tested stack 1). In addition, connections between the network switches 11 that are established in the previous steps are disconnected, and the network switches 11 may be controlled to restart. The operations of step 510 may generally be implemented in a cases where the additional network switch 11 is present in the to-be-tested stack 1. Afterwards, the flow goes back to step 502. As such, the method may continue until it is determined that there is not a network switch 11 that has not yet been activated.

Figure 4:
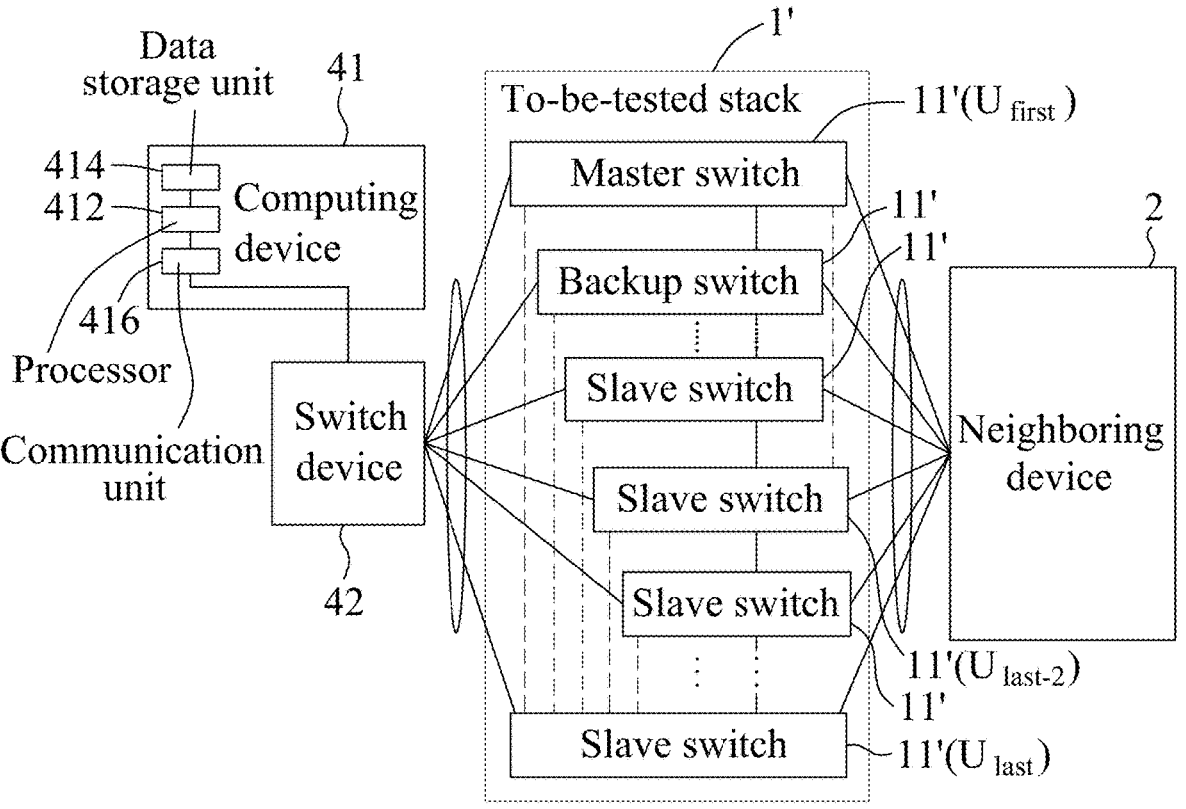
FIG. 4 is a block diagram of a system for automatically changing a topology of a plurality of network switches according to one embodiment of the disclosure.

FIG. 4 is a block diagram of a system for automatically changing a topology of a plurality of network switches according to one embodiment of the disclosure. The system includes a to-be-tested stack 1', a neighboring device 2, a switch device 42 and a computing device 41. It is noted that the combination of the to-be-tested stack 1', the neighboring device 2 and the switch device 42 may be referred to as a topology structure.

In the embodiment of FIG. 4, the to-be-tested stack 1' includes a number M of network switches 11'. In some embodiments, M is not smaller than 5. Each of the network switches 11' may similarly be embodied using a network switch that supports multi-layer functionalities within the Ethernet, supports a number of routing protocols, and is said to be "stackable". In the embodiment of FIG. 4, the network switches 11' are said to be stacked in the following manner.

The network switches 11' are arranged in a top-down column with two adjacent network switches 11' being physically connected to each other using a physical cable or a wire (i.e., stacking cables, indicated by the solid lines). One of the network switches 11' that is placed on the top (i.e., at the start of the column) is also referred to as a master switch ($U_{first}$) that is used for communicating with the external environment, and one of the network switches 11' that is placed on the bottom (i.e., at the end of the column) is also referred to as a last switch ($U_{last}$). One of the network switches 11' that is neither the master switch nor the last switch may be assigned as a backup switch ($U_{backup}$) for the master switch, and each of the network switches 11' that is neither the master switch nor the backup switch may be referred to as a slave switch. It is noted that four slave switches (including the last switch) are present in the embodiment of FIG. 4, while additional slave switches may be employed in other embodiments. Moreover, in other embodiments, another one of the network switches 11' included in the to-be-tested stack 1' may be assigned as the master switch, and yet another one of the network switches 11' included in the to-be-tested stack 1' may be assigned as the backup switch. That is to say, the assignment of the master switch and the backup switch is not limited to the configuration of FIG. 4.

In addition to the above connection, each of the network switches 11' that is not the last switch is also directly connected to the last switch, and the one of the network switches 11' that is arranged at the top of the column (i.e., the master switch, also referred to as a first switch) is connected to one of the network switches 11' that is arranged at a third position counted from the bottom to the top of the column and that is labelled as ($U_{last-2}$), the connections being indicated by the broken lines. For the sake of simplified description, the one of the network switches 11' that is arranged at the third position counted from the bottom to the top of the column and that is labelled as ($U_{last-2}$) is referred to as a third-to-last switch hereafter.

Figure 5A:
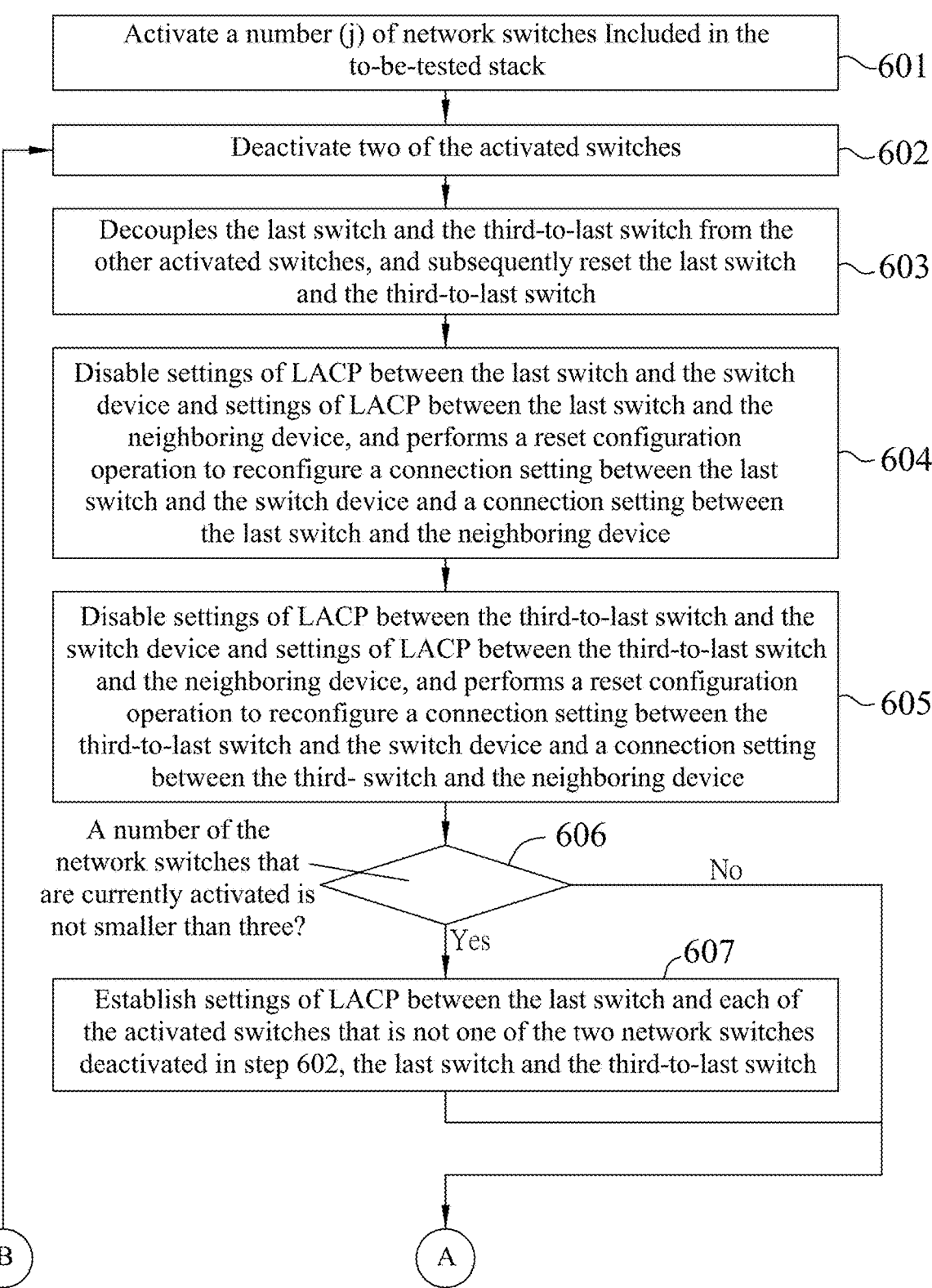
FIGS. 5A and 5B constitute a flow chart illustrating steps of an exemplary method for automatically changing a topology of a plurality of network switches according to one embodiment of the disclosure.
Figure 5B:
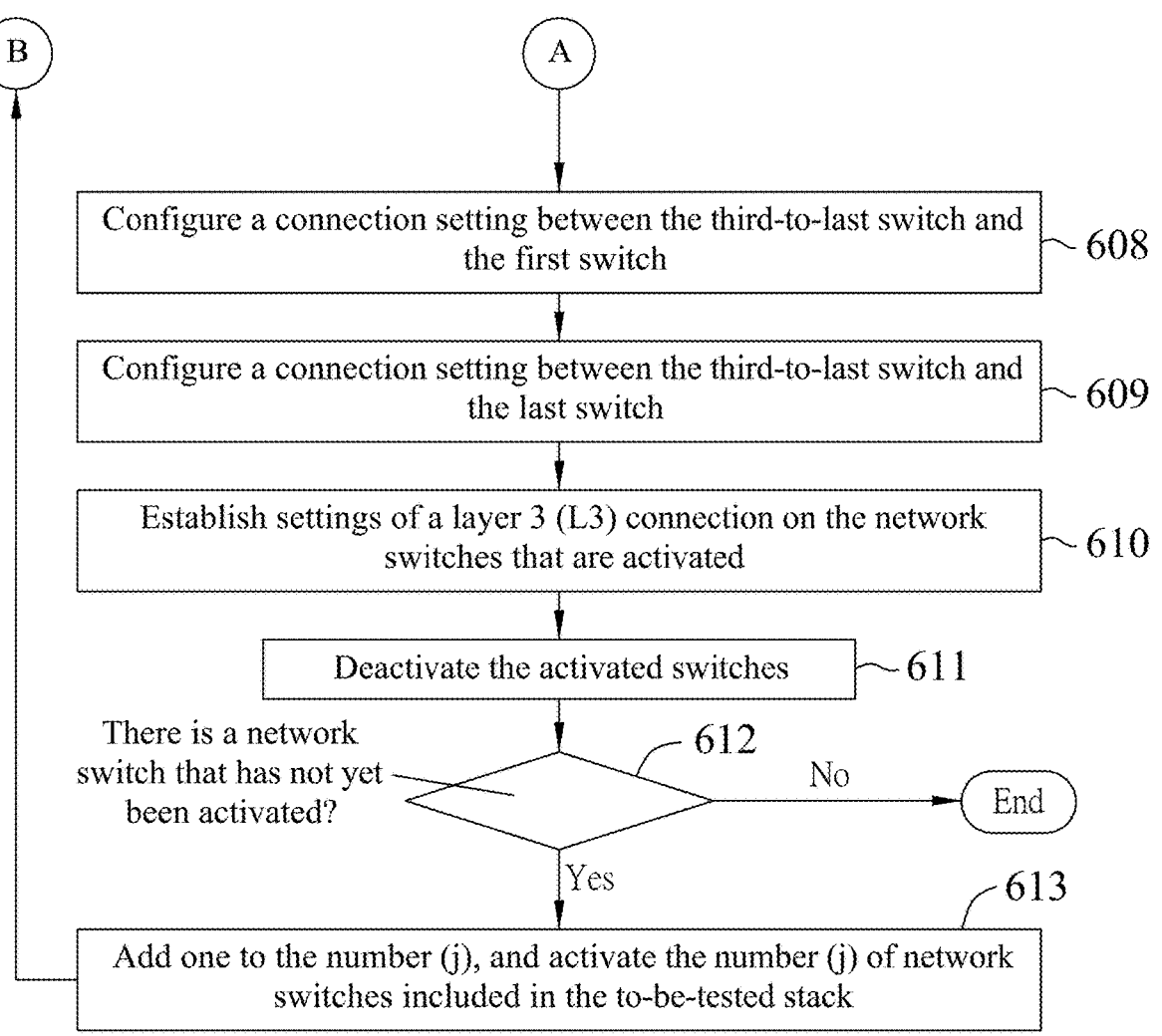

FIGS. 5A and 5B constitute a flow chart illustrating steps of an exemplary method for automatically switching a topology of a plurality of network switches according to one embodiment of the disclosure. In the embodiment of FIGS. 5A and 5B, the method is implemented using the system of FIG. 4. It is noted that the embodiment of FIGS. 5A and 5B illustrates the topology of the to-be-tested stack 1' being changed from the point-to-point topology to the mesh topology.

In the embodiment of FIG. 4, each of the neighboring device 2 and the switch device 42 may be embodied using a network switch as described in the embodiment of FIG. 1. The computing device 41 may be embodied using the switching device 41 as described in the embodiment of FIG. 1.

In step 601, the computing device 41 activates a number (j) of network switches 11' included in the to-be-tested stack 1', and j is an integer not smaller than 5. In the embodiment of FIG. 2, (j) equals 5, and the number (j) of network switches 11' include the first switch and a number (j–1) of network switches 11' that are arranged from the end of the column (i.e., (j–1) equals four, meaning that the last four network switches 11' of FIG. 4 are activated). The network switches 11' that are activated in step 601 are referred to as activated switches.

In step 602, the computing device 41 deactivates two of the activated switches excepting the last switch, the first switch and the third-to-last switch. In the embodiment of FIG. 4, the network switches 11' that are arranged at the second and the fourth positions counted from the bottom to the top of the column (i.e., the second-to-last and fourth-to-last network switches 11' included in the to-be-tested stack 1') are deactivated, respectively. That is to say, the last switch, the first switch and the third-to-last switch remain activated. Generally, two of the activated switches that are not the last switch may be deactivated, and are referred to as the deactivated switches.

In step 603, the computing device 41 decouples the last switch and the third-to-last switch from the other activated switches (excluding the last switch and the deactivated switches) (that is, to remove the last switch and the third-to-last switch from the original connections within the to-be-tested stack 1' using the stacking cables), and subsequently resets the last switch and the third-to-last switch. In this manner, the last switch and the third-to-last switch are no longer stacked with the other activated switches. This effectively makes the last switch, the third-to-last switch and the other activated switches which are still stacked as three individual components.

In step 604, the computing device 41 disables settings of LACP between the last switch and the switch device 42 and settings of LACP between the last switch and the neighboring device 2, and performs a reset configuration operation to reconfigure a connection setting between the last switch and the switch device 42 and a connection setting between the last switch and the neighboring device 2.

In step 605, the computing device 41 disables settings of LACP between the third-to-last switch and the switch device 42 and settings of LACP between the third-to-last switch and the neighboring device 2, and performs a reset configuration operation to reconfigure a connection setting between the third-to-last switch and the switch device 42 and a connection setting between the third-switch and the neighboring device 2.

In step 606, the computing device 41 determines whether a number (i.e., j–3) of the network switches 11' that are currently activated, and that are not the two network switches deactivated in step 602 or the third-to-last switch, is not smaller than 3. In a case where it is determined that the number of the network switches 11' that are currently activated is not smaller than 3, the flow proceeds to step 607. Otherwise, the flow proceeds to step 608.

In step 607, the computing device 41 establishes settings of LACP between the last switch and each of the activated switches that is not one of the two network switches deactivated in step 602, the last switch and the third-to-last switch. In this manner, a single logic connection is formed using a number of physical connections that are configured with the settings of LACP, in order to be able to carry more network traffic.

Figure 6:
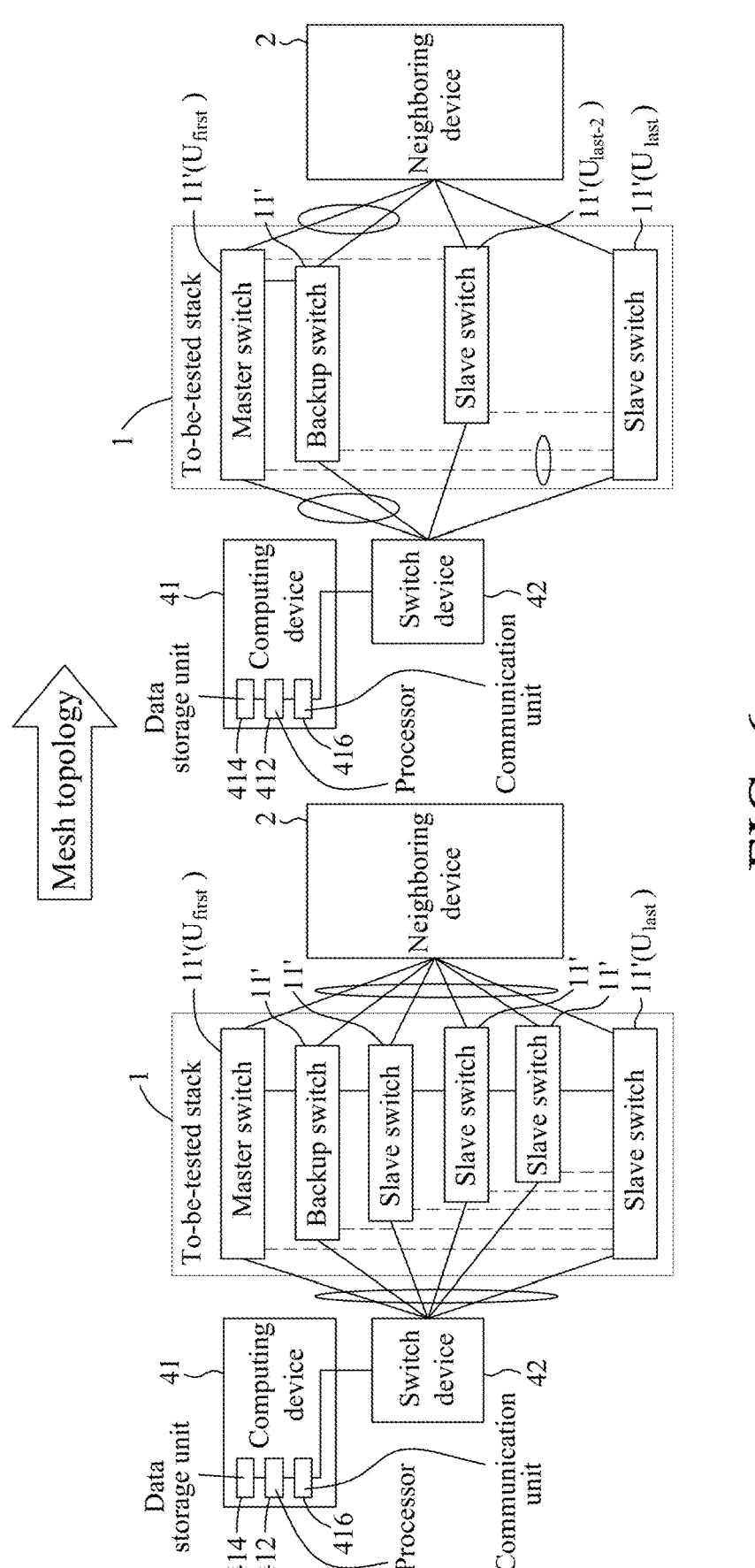
FIG. 6 illustrates the topologies of the network switches being changed from the point-to-point topology to the mesh topology.

FIG. 6 illustrates the topologies of the network switches 11' being switched from the point-to-point topology to the mesh topology. It is noted that each of the ellipses shown in FIG. 6 is drawn to cover a number of lines that interconnect the components of the system to indicate that those physical connections are configured with settings of LACP. That is to say, each of the ellipses indicates a single logic connection formed by the physical connections covered by the ellipse.

In step 608, the computing device 41 configures a connection setting between the third-to-last switch and the first switch.

In step 609, the computing device 41 configures a connection setting between the third-to-last switch and the last switch.

In step 610, the computing device 41 establishes settings of a layer 3 (L3) connection on the network switches 11' that are, at this stage, activated (that is, the deactivated switches are excluded).

In some embodiments, after the operations of step 610 are completed, the to-be-tested stack 1' has been changed into the mesh topology and is available to be subjected to a testing procedure to test routing efficiency associated with the L3 connection. It is noted that in this embodiment, the operations of step 610 are done with respect to settings of the L3 connection, while in other embodiments, the operations of step 610 are done with respect to settings of a layer 2 (L2) connection. In some embodiments, the computing device 41 may be configured such that a user is able to choose whether to test routing efficiency associated with the L2 connection prior to the steps of the method as shown in FIGS. 5A and 5B being performed. It is noted that the testing procedure for testing the routing efficiency is well known in the related art, details thereof are omitted herein for the sake of brevity.

In this configuration, the last switch is connected to the switch device 42 and the neighboring device 2, the third-to-last switch is connected to the switch device 42 and the neighboring device 2, and other stacked network switches 11' are connected to the switch device 42 and the neighboring device 2 with the settings of LACP. Moreover, the last switch, the third-to-last switch and the other stacked network switches 11' are connected to one another while the connections between the last switch and the other stacked network switches 11' are further configured with the settings of LACP. This arrangement among the network switches 11' and the neighboring device 2 may be referred to as the mesh topology.

Then, in step 611, the computing device 41 deactivates the number (j) of network switches 11' that are activated in step 601. It is noted that in practice, the computing device 41 may transmit a deactivation signal to each of the number (j) of network switches 11'; alternatively, since the deactivated switches are already deactivated, the computing device 41 may only transmit the deactivation signal to each of the number (j–2) of network switches 11' that are still activated.

In step 612, the computing device 41 determines whether there is a network switch 11' that has not yet been activated. In a case where it is determined that there is a network switch 11' that has not yet been activated (meaning that the to-be-tested stack 1' includes an additional network switch 11' that can be added to the changed topology), the flow proceeds to step 613. Otherwise, in a case where it is determined that there is not a network switch 11' that has not yet been activated, the method is terminated.

In step 613, the computing device 41 adds one to the number (j), and activates the number (j) of network switches 11' included in the to-be-tested stack 1'. In the embodiment of FIGS. 5A and 5B, (j) now equals 6, and the number (j) of network switches 11' include four network switches 11' that are arranged from the bottom of the column and a number (j–4) of network switches 11' that are arranged from the top of the column. In addition, connections between the network switches 11' that are established in the previous steps excepting the connection between the last switch and the third-to-last switch are disconnected, and the network switches 11' may be controlled to restart. Afterwards, the flow goes back to step 602. As such, the method may continue until it is determined that there is not a network switch 11' that has not yet been activated.

To sum up, the embodiments of the disclosure provide a method for automatically changing a topology of a plurality of stacked network switches 11. In the method, a computing device 41 deactivates at least one network switch 11 included in the to-be-tested stack 1, thereby starting the process of changing the topology. Then, the computing device 41 automatically implements the reset configuration operation, and in this manner, the settings related to the specific topology that is to be changed (i.e., the loop topology or the mesh topology) may be imported for different network switches 11 included in the to-be-tested stack 1. Afterwards, the to-be-tested stack 1 may then be used in various testing for efficiency, and one or more additional network switch(es) 11 may be added into the changed topology. As such, the method enables a topology of the to-be-tested stack 1 to be automatically changed with a higher accuracy, eliminating the needs for complicated manual operations.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various feature sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically changing a topology of a plurality of network switches, the method being used on a topology structure that includes a to-be-tested stack, a neighboring device and a switch device, the to-be-tested stack being connected to the neighboring device and the switch device through Link Aggregation Control Protocol (LACP), the to-be-tested stack including a number N of network switches that are stacked in a manner where any adjacent two of the network switches are connected to each other, N being not smaller than 3, each of the network switches that is not a last switch among the number N of network switches being connected directly to the last switch, the method being implemented using a computing device connected to the topology structure and comprising steps of:

a) activating a number (i) of network switches included in the to-be-tested stack as activated switches, the number (i) of network switches including the last switch and the first (i−1) network switches in the to-be-tested stack, (i) being an integer not smaller than 3;

b) deactivating one of the activated switches excepting the last switch as a deactivated switch;

c) decoupling the last switch from the other activated switches, and resetting the last switch;

d) disabling settings of LACP between the last switch and the switch device, disabling settings of LACP between the last switch and the neighboring device, and performing a reset configuration operation to reconfigure a connection setting between the last switch and the switch device and a connection setting between the last switch and the neighboring device; and e) establishing settings of LACP between the last switch and each of the network switches that is neither the deactivated switch nor the last switch.

2. The method of claim 1, wherein in step b), one of the network switches that is arranged in the $(i−1)^{th}$ one of the to-be-tested stack is disabled.

3. The method of claim 1, wherein step e) is executed after it is determined that a number of the network switches that is currently activated is not smaller than 3.

4. The method of claim 1, further comprising, after step e), steps of:

deactivating the number (i) of activated switches; and in a case where there is a network switch that has not yet been activated, adding one to the number (i), activating the number (i) of network switches included in the to-be-tested stack, the number (i) of network switches including the last switch and the first (i−1) network switches in the to-be-tested stack, disconnecting connections between the network switches that are established previously, and repeating step b).

5. A method for automatically changing a topology of a plurality of network switches, the method being used on a topology structure that includes a to-be-tested stack, a neighboring device and a switch device, the to-be-tested stack being connected to the neighboring device and the switch device through Link Aggregation Control Protocol (LACP), the to-be-tested stack including a number M of network switches that are stacked in a manner where any adjacent two of the network switches are connected to each other, M being not smaller than 5, each of the network switches that is not a last switch among the number M of network switches being connected directly to the last switch, a first switch being connected directly to a third-to-last switch among the number M of network switches, the method being implemented using a computing device connected to the topology structure and comprising steps of:

a) activating a number (j) of network switches included in the to-be-tested stack as activated switches, the number (i) of network switches including a first switch and last (j−1) network switches in the to-be-tested stack, j being an integer not smaller than 5;

b) deactivating two of the activated switches excepting the last switch, the first switch and the third-to-last switch as deactivated switches;

c) decoupling the last switch and the third-to-last switch from the other activated switches, and resetting the last switch and the third-to-last switch;

d) disabling settings of LACP between the last switch and the switch device, disabling settings of LACP between the last switch and the neighboring device, and performing a reset configuration operation to reconfigure a connection setting between the last switch and the switch device and a connection setting between the last switch and the neighboring device;

e) disabling settings of LACP between the third-to-last switch and the switch device, disabling settings of LACP between the third-to-last switch and the neighboring device, and performing a reset configuration operation to reconfigure a connection setting between the third-to-last switch and the switch device and a connection setting between the third-to-last switch and the neighboring device;

f) establishing settings of LACP between the last switch and each of the activated switches that is not one of the last switch and the third-to-last switch;

g) configuring a connection setting between the third-to-last switch and the first switch; and h) configuring a connection setting between the third-to-last switch and the last switch.

6. The method of claim 5, wherein in step b), two of the network switches that are arranged in a second-to-last position in the to-be-tested stack and a fourth-to-last position in the to-be-tested stack, respectively, are disabled.

7. The method of claim 5, wherein step f) is executed after it is determined that a number of the network switches which are currently activated, and none of which are the third-to-last switch, is not smaller than 3.

8. The method of claim 5, further comprising, after step f), steps of:

deactivating the number (j) of activated switches; and in a case where there is a network switch that has not yet been activated, adding one to the number (j), activating the number (j) of network switches included in the to-be-tested stack, the number (j) of network switches including the first switch and the last (j−1) network switches in the to-be-tested stack, disconnecting connections between the network switches that are established previously excepting the connection between the last switch and the third-to-last switch, and repeating step b).

\* \* \* \* \*